(12) United States Patent
Lin et al.

(10) Patent No.: US 8,515,447 B2
(45) Date of Patent: Aug. 20, 2013

(54) METHOD AND SYSTEM FOR PROVIDING SERVICE CHANNEL IN A VEHICULAR ENVIRONMENT, METHOD AND SYSTEM FOR SWITCHING SERVICE CHANNEL, AND COMPUTER READABLE MEDIUM

(75) Inventors: Kang-Chiao Lin, Zhushan Township, Nantou County (TW); Kai-Yun Ho, Taichung (TW); Hsia-Hsin Li, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 169 days.

(21) Appl. No.: 13/076,884

(22) Filed: Mar. 31, 2011

(65) Prior Publication Data

US 2012/0149389 A1 Jun. 14, 2012

(30) Foreign Application Priority Data

Dec. 8, 2010 (TW) ................................ 99142895 A

(51) Int. Cl.
*H04W 24/00* (2009.01)
(52) U.S. Cl.
USPC .................................... 455/456.1; 455/404.2
(58) Field of Classification Search
USPC ......... 455/404.1, 404.2, 456.1, 515, 412.1–2, 455/70–71
See application file for complete search history.

(56) References Cited

U.S. PATENT DOCUMENTS

| | | | |
|---|---|---|---|
| 8,116,959 B2 * | 2/2012 | Laberteaux et al. ........... | 701/100 |
| 2007/0299571 A1 | 12/2007 | Laberteaux et al. | |
| 2008/0232433 A1 * | 9/2008 | McNew et al. ............... | 375/140 |
| 2009/0196264 A1 * | 8/2009 | Uchida .......................... | 370/337 |
| 2011/0141970 A1 * | 6/2011 | Juan et al. ..................... | 370/328 |
| 2011/0158104 A1 * | 6/2011 | Frenger et al. ................ | 370/241 |
| 2011/0255482 A1 * | 10/2011 | Holland et al. ............... | 370/329 |
| 2012/0093091 A1 * | 4/2012 | Kang et al. .................... | 370/329 |

FOREIGN PATENT DOCUMENTS

| | | |
|---|---|---|
| TW | I276244 | 3/2007 |
| TW | I324004 | 4/2010 |

OTHER PUBLICATIONS

English language translation of abstract of TW I276244 (published Mar. 11, 2007).
English language translation of abstract of TW I324004 (published Apr. 21, 2010).
Wang, Z., et al.; "Context-Aware Channel Coordination for DSRC;" IEEE; 2008; pp. 1-6.

(Continued)

*Primary Examiner* — Cong Tran
(74) *Attorney, Agent, or Firm* — McClure, Qualey & Rodack, LLP

(57) ABSTRACT

A method for switching service channels in a vehicular environment is provided for performing communications between a user unit and a service provider unit according to a switch ratio between a service channel and a control channel in a multi-channel switching wireless communication environment. The method includes the following steps. In response to a message indicating that the service provider unit uses an access mode of an extended service channel, whether information of the switch ratio is stored in service information of the user unit is searched in the user unit according to geographical information of the service provider unit. If the information of the switch ratio is stored in the service information of the user unit in the searching step, the user unit is set accordingly to enter the access mode of the extended service channel.

23 Claims, 5 Drawing Sheets

(56) References Cited

OTHER PUBLICATIONS

Mak, T.K., et al.; "Multichannel Medium Access Control for Dedicated Short-Range Communications;" IEEE Transactions on Vehicular Technology; vol. 58; No. 1; Jan. 2009; pp. 349-366.

Wang, S.Y., et al.; "Improving the Channel Utilization of IEEE 802.11p/1609 Networks;" IEEE Communications Society; 2009; pp. 1-6.

Huang, C.M., et al.; "An Effective Channel Utilization Scheme for IEEE 1609.4 Protocol;" IEEE; 2009; pp. 1-6.

Wang, Q., et al.; "An Enhanced Multi-Channel MAC for the IEEE 1609.4 Based Vehicular Ad Hoc Networks;" IEEE Communications Society; 2010; pp. 1-2.

"IEEE P1609.3/D8: Draft Standard for Wireless Access in Vehicular Environments (WAVE)—Networking Services;" Aug. 2010; pp. 1-140.

"IEEE 1609.4/D9: Draft Standard for Wireless Access in Vehicular Environments (WAVE)—Multi-Channel Operation;" Aug. 2010; pp. 1-81.

* cited by examiner

METHOD AND SYSTEM FOR PROVIDING SERVICE CHANNEL IN A VEHICULAR ENVIRONMENT, METHOD AND SYSTEM FOR SWITCHING SERVICE CHANNEL, AND COMPUTER READABLE MEDIUM

This application claims the benefit of Taiwan application Serial No. 99142895, filed Dec. 8, 2010, the subject matter of which is incorporated herein by reference.

BACKGROUND

1. Technical Field

The disclosure relates in general to a method and a system of service channels in a vehicular environment, and more particularly to a method and a system for switching service channels in a vehicular environment.

2. Description of the Related Art

Due to the maturity in the technology of wireless communication, navigation, and on-board electronics, many countries are dedicated to the research and development in the vehicular communication technology with an attempt to creating new industries. Considering the high mobility and instantaneity of the vehicles as well the characteristics of a wireless network itself, it is acknowledged that there are significant differences between the demands for communications in vehicular environment and commonly used wireless communication technologies such as 3.5G and Wi-Fi. Thus, the IEEE Standard Association develops a set of protocols for on-board communication, such as IEEE 1609 for wireless access in vehicular environment (WAVE), which includes a protocol group for processing respective layers of the network OSI model and performing communication with the accompany of the IEEE 802.11p physical layer.

In the bottom layer of IEEE 1609 protocol, the channels are divided into a control channel and several service channels. The control channel is for transmitting emergency information and used as a channel via which a service provider sends a broadcast packet to inform the users within the coverage of communication about the information of the services provided by the service provider and the service channels belonging to the service provider. The service channels are for transmitting various services. Due to the restrictions on the communication hardware as stipulated in the protocol, the service provider end should employ at least two antennas: one for the control channel and the other for the service channel. When the user end uses a single antenna, only one channel can be monitored at a time. Thus, the protocol provides the user with a mode in which the control channel and the service channel are being switched alternately with an equal ratio in time. In addition, the protocol has been updated to introduce a functionality of extending the time limit of the service channel, wherein the user end pre-determines an extension interval. However, the restrictions on the communication hardware remain unchanged, and the flexibility and the channel utilization rate are still insufficient for both the service provider end and the user end.

SUMMARY

The disclosure is directed to embodiments of a method and system for providing service channels in a vehicular environment, a method and a system for switching service channels and a computer readable medium. In an embodiment, the service provider can adjust the switch ratio between a control channel and a service channel according to service characteristics.

The disclosure provides an embodiment of a method for switching service channels in a vehicular environment. The method includes the following steps: In response to a message indicating that a service provider unit uses an access mode of an extended service channel, whether information of the switch ratio is stored in service information of the user unit is searched in the user unit according to geographical information of the service provider unit. If the information of the switch ratio is stored in the service information of the user unit in the searching step, the user unit is set accordingly to enter the access mode of the extended service channel.

The disclosure provides an embodiment of a computer readable medium having instructions for performing the above method for switching service channels in a vehicular environment.

The disclosure provides an embodiment of a communication system using a vehicular communication service. The system includes a wireless communication module, a memory unit, and a processing module. The wireless communication module communicates with a service provider unit according to a switch ratio between a service channel and a control channel. In response to a message indicating that a service provider unit uses an access mode of an extended service channel, the processing module, according to geographical information of the service provider unit, searches whether the information of the switch ratio is stored in the memory unit. The processing module sets the user unit to enter an access mode of an extended service channel according to the information of the switch ratio obtained from the memory unit.

The disclosure provides an embodiment of a method for providing service channels in a vehicular environment. The method includes the following steps: In a service provider unit, a switch ratio between a control channel and a service channel is adjusted, and a broadcast message indicating the channel access mode used by the service provider unit is sent. In response to the broadcast message indicating that the service provider unit uses an access mode of an extended service channel, information of a switch ratio between the service channel and the control channel is obtained in a user unit according to geographical information of the service provider unit, and the user unit is set to enter the access mode of the extended service channel.

The disclosure provides an embodiment of a system for providing service channels in a vehicular environment. The system includes a service provider unit and a user unit for implementing the method of the above embodiment. The service provider unit provides communication service.

The above and other aspects of the disclosure will become better understood with regard to the following detailed description of the non-limiting embodiment(s). The following description is made with reference to the accompanying drawings.

DETAILED DESCRIPTION

Figure 1:
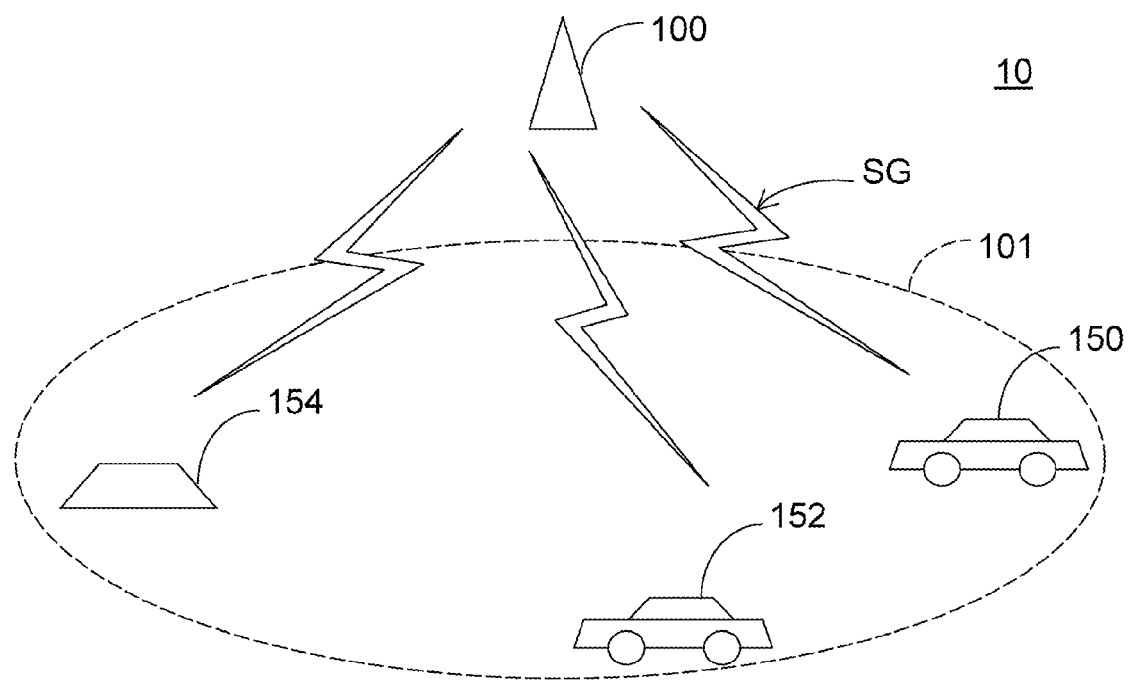
FIG. 1 shows a system for providing service channels in a vehicular environment according to an embodiment of the disclosure.

FIG. 1 shows a system for providing service channels in a vehicular environment according to an embodiment of the disclosure. In a multi-channel switching wireless communication environment, a vehicular communication service system 10 of FIG. 1 provides communication service between vehicles or between a vehicle and a roadside unit or a mobile station according to a vehicular communication protocol such as IEEE 1609. The vehicular communication service system 10 includes at least one service provider unit 100, such as a roadside unit (RSU) or a service provider end apparatus, and at least one user unit, such as an on-board unit (OBU) 150 or a mobile station such as a car PC, a navigation system or a user end communication apparatus compliant with IEEE 1609 protocol. To effectively increase the utilization rate of the service channel, the service provider unit 100 of the present embodiment adjusts a ratio of switching (hereinafter, switch ratio) between the service channel (SCH) and the control channel (CCH) in a signal SG sent from the service provider unit 100, according to the characteristics of the provided service. For example, the switch ratio being A:B denotes that the service channel is continuously accessed for intervals of a number of A and the control channel is continuously accessed for intervals of a number of B. To increase the utilization rate of the service channel, the relationship between parameters A and B is set as: A>B, and such access mode is referred to as an access mode of an extended service channel. When the user unit, such as the on-board units 150 and 152 or the mobile unit 154, enters a service coverage 101, the user unit can dynamically obtain the information of the switch ratio corresponding to the current channel access mode of a service provided by the service provider unit by way of, for example, query or calculation based on map data and use the service by alternately switching between the control channel and the service channel. The method by which the user unit dynamically obtains the switch ratio of the service is disclosed below in different embodiments. Thus, the service provider unit 100 and the user unit 150 can effectively increase the channel utilization rate with the switch ratio capable of extending the time of the service channel.

In the above embodiment, the service provider unit 100 adjusts the switch ratio between the control channel and the service channel according to a required frequency for an individual application at which service advertisement messages, such as WAVE service advertisement (WSA) packets or messages, are sent. Specifically, various on-board applications have different latency requirements, so the required frequencies for the applications at which the WSA packets are sent differ accordingly. For example, the allowed latencies for the traffic signal violation warning service, the left turn assistant service, and the pedestrian crossing information at designated intersections service are about 100 ms; the latency tolerance for the post-crash warning service is about 0.5 s. The latencies for the approaching emergency vehicle warning service, and the curve speed warning service are about 1 s.

The service provider unit 100 extends the access times of the service channel according to the characteristics of the latency requirement of the application, so that the channel utilization rate can be increased.

According to IEEE 1609 protocol, a channel is divided into a control channel and 6 service channels, and a timing sequence is divided into a control interval (CCH interval) and a service interval (SCH interval), wherein emergency information with security and high priority or a WSA messages are transmitted via the control intervals and ordinary service information is exchanged via the service intervals. In addition, IEEE 1609 protocol provides various channel access modes such as continuous access, alternating access, immediate access and extended access. The extended access mode enables the apparatus to stay in the service channel without returning to the control channel at the end of the service interval. In the extended access mode compliant with the standard protocol, the service software that serves the user needs to predetermine an extension interval, the service provider must have multiple antennas, one antenna is switched to the control channel and the remaining antennas are switched to the service channel. In the standard practice, the service provider cannot adjust the switch ratio between the control channel and the service channel according to the characteristics of service, and cannot dynamically obtain the current access mode of the service provided by service provider when the user enters or leaves the service coverage. Although the channel utilization rate can be slightly increased in an extended access mode temporarily under the standard protocol in which the service provider requires a multi-antenna apparatus, a substantial increment of the channel utilization rate still cannot be achieved.

In the above embodiment, the signal SG sent from the service provider unit 100 is switched between the control channel and the service channel. In this way, the service provider unit 100 can send the signal SG with a single antenna in the present embodiment. In the present embodiment, the channel utilization rate can be effectively increased if the service provider unit 100 and the user unit 150 can use a switch ratio extending the time of the service channel. In addition, the service provider unit 100 of the present embodiment is not limited to the implementation with a single antenna.

According to the above embodiment of FIG. 1, the service provider unit 100 provides the information of the switch ratio in the signal SG, or the user unit 150, which selects the service of the service provider unit 100, obtains the switch ratio by way of query so as to receive the signal from the service provider unit 100 via the control channel and the service channel. The service provider unit 100 achieves the above processing, for example, by using the characteristics of IEEE 1609. The service provider unit 100 can indicate the channel access mode by using a "channel access" field of the "extension field" of the "channel info" of the WSA message. According to IEEE 1609 protocol, the "channel access" field having a value of 0 implies that the service channel can be continuously accessed; the field having a value of 1 implies that the apparatus only provides service access at the service interval, i.e., in an alternating channel access mode. The access mode of the extended service channel of the above embodiment is thus indicated by the "channel access" field used in the service provider unit 100 having a value of 0, which denotes the usage of other channel access mode, so as to be compliant with IEEE 1609 protocol. Since the way of providing the information of the switch ratio is not defined in the current IEEE 1609 protocol, in a practical example disclosed above, the service provider unit 100 enables the user unit 150 to obtain the information of the switch ratio by way of searching.

Figure 2:
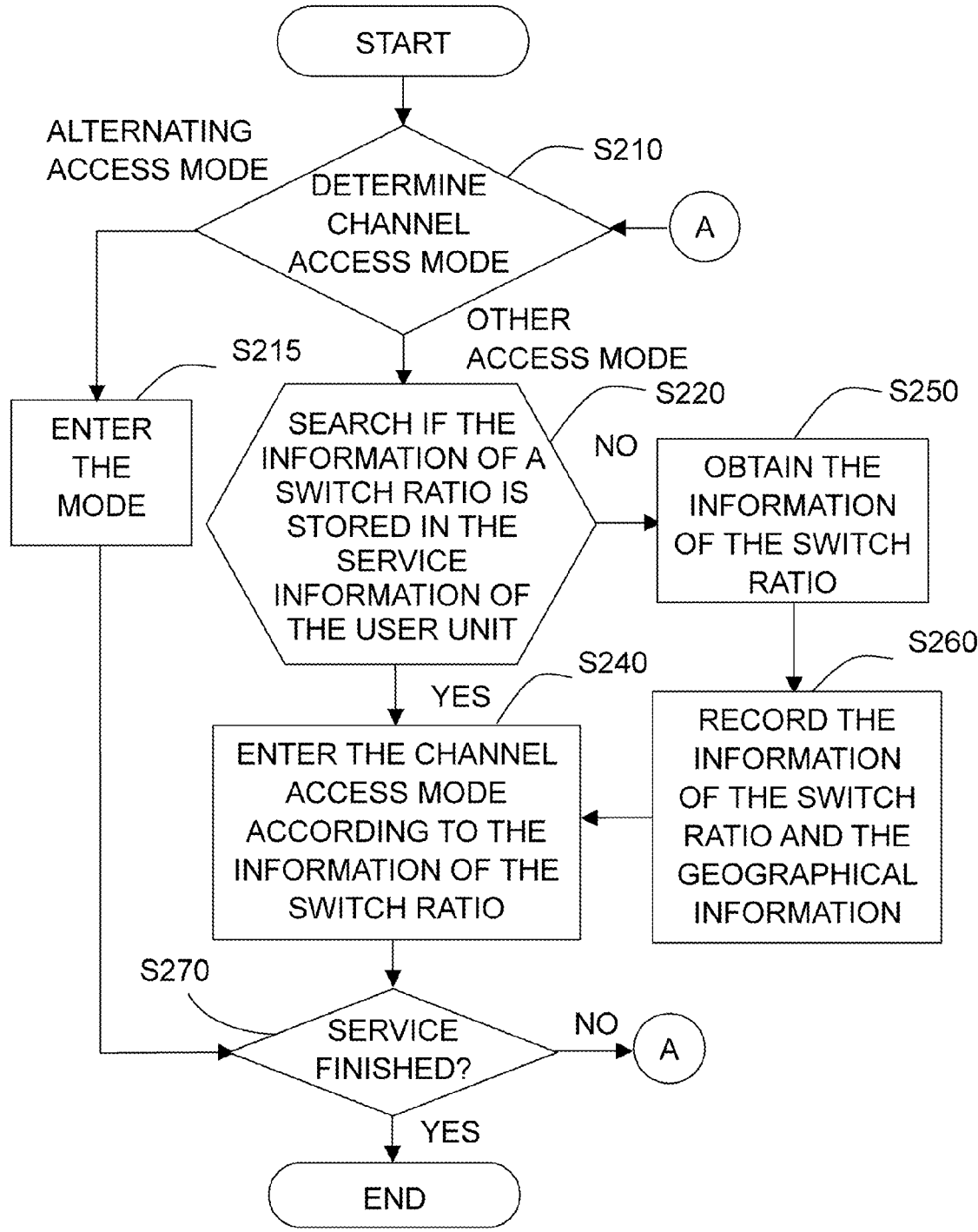
FIG. 2 shows a method for switching service channels in a vehicular environment according to an embodiment of the disclosure.

FIG. 2 shows a method for switching service channels in a vehicular environment according to an embodiment of the disclosure. The user unit 150 can obtain the information of the switch ratio by the method disclosed in an embodiment of the disclosure. The information of the switch ratio can be indicated as a ratio of A:B as disclosed above, an extended access parameter, e.g., ExtendedAccess defined in the IEEE 1609 protocol, or the number of service intervals, but the indication is not limited thereto, and any manner capable of indicating the value of a switch ratio between the control channel and the service channel would do as well.

As indicated in step S210, the channel access mode is determined. In the above example of IEEE 1609, after the WSA message is received by a user unit 150 and the matching is successful, then the user unit is within the service coverage of the service provider, and the channel access mode of the service provider unit 100 is determined according to the "channel access" field of the WSA message. When the "channel access" field equals 1, this indicates that the channel of the service provider unit 100 is in an alternating access mode, i.e., in a switch ratio of 1:1 or the parameter of the extended access being equal to 0. As indicated in step S215, the user unit 150 enters an alternating access mode. If the "channel access" field equals 0, this indicates that the service provided by the service provider unit 100 is in a continuous access mode. The service provider unit 100 can extend the continuous access mode to indicate other channel access modes such as the access mode of the extended service channel disclosed in the above embodiment.

Thus, the user unit 150 further needs to obtain the switch ratio. As indicated in step S220, the user unit 150 searches whether the local service information of the user unit 150 includes the information of the switch ratio of the service, such as an extended access parameter or a record of ExtendedAccess, according to the geographical information, such as the GPS coordinate information of the service provider unit of the WSA message or the geographical information provided by other navigation system. The service information, for example, includes at least one piece of information of the switch ratio corresponding to a service provided by a service provider unit. If the service information does not exist, then the service information can be established after being obtained. The service information is such as the historic record of the switch ratio previously used by the service provider unit 100 or information that is preloaded or downloaded from a readable medium or a website. If the searching in step S220 shows that the service information includes the information of the switch ratio of the service provider unit 100, the method proceeds to step S240, the user unit 150 alternatively accesses the control channel and the service channel of the service provider unit 100 according to the information of the switch ratio obtained by way of searching.

If the searching in step S220 does not show any corresponding information of the switch ratio, the method proceeds to step S250, the information is obtained by other methods. The implementation of step S250 is exemplified below by way of searching or the calculation based on map data. Then, the method proceeds to step S260, the results obtained in step S250 are stored in the service information, which is used for accessing the service provider unit 100 next time.

Figure 3A:
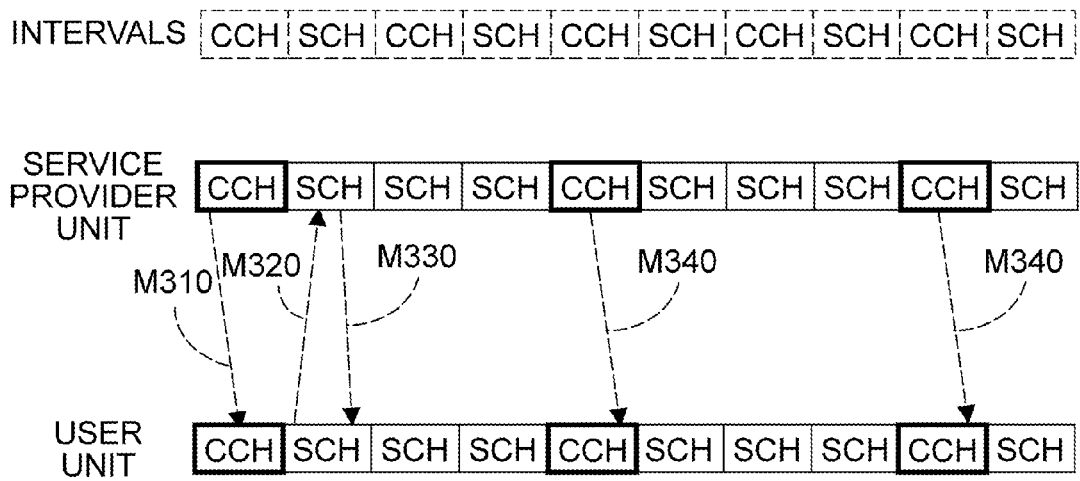
FIG. 3A shows a timing diagram for illustrating how to obtain switch ratio information from the channel by way of external query according to an embodiment of the disclosure.

FIG. 3A shows a timing diagram for illustrating how to obtain switch ratio information from the channel by way of external query according to an embodiment of the disclosure. In FIG. 3A, with respect to the standard control intervals and service intervals, the switch ratio used by the service provider unit is 3:1. That is, the number of the service interval used by the service provider unit is 3 (i.e., there are 3 service intervals between two control intervals). In other words, the extended access parameter is 1, wherein the value of the extended access parameter means the number of standard control intervals that are ignored. In FIG. 3A, the extended access parameter equals 1, which means that one standard control interval is ignored following each control interval, so that the number of available service intervals is 3. As indicated in the arrow sign M310, the WSA message sent from the service provider unit includes geographical information of the service provider unit, such as GPS coordinate information, in addition to service information. Referring to step S250 of FIG. 2. After the service is successfully matched by the user unit, since the service information is lacking of corresponding information of the switch ratio, the user unit sends a message to request the service provider unit to provide information of the switch ratio at a service interval, as indicated in the arrow sign M320. For example, the user unit sends a message requesting for an extended access parameter. As indicated in the arrow sign M330, the service provider unit sends a message including an extended access parameter to the user unit in response to the above requesting message. After the user unit receives the message, as indicated in step S240, the channel access mode is switched. Afterwards, as indicated in FIG. 3A, the user unit uses the same switch ratio as the service provider unit does, and there is 1 control interval following 3 continuous service channel intervals, and the service provider unit sends a WSA message as indicated in the arrow sign M340.

Figure 3B:
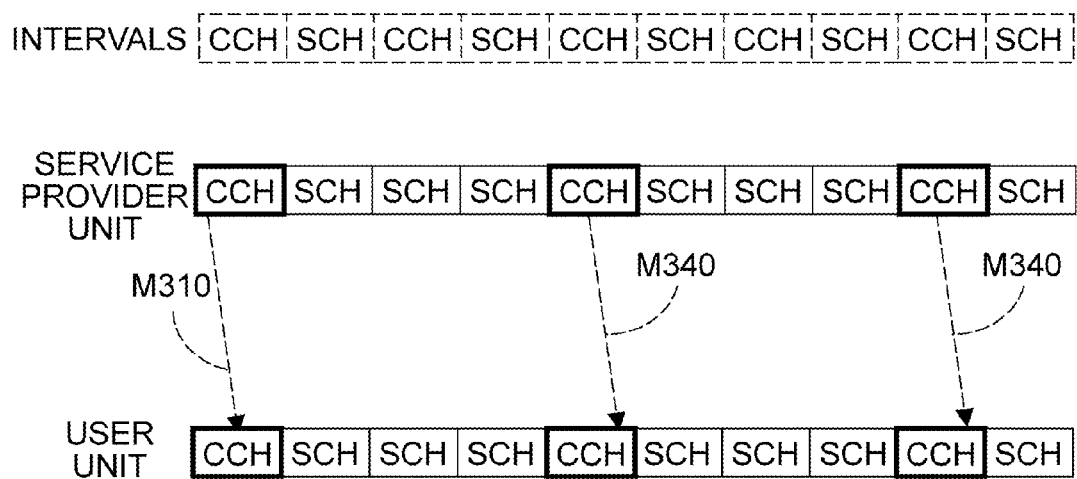
FIG. 3B shows a timing diagram for illustrating that switch ratio information is obtained by way of calculation based on map data according to an embodiment of the disclosure.

FIG. 3B shows a timing diagram for illustrating that switch ratio information is obtained by way of calculation based on map data according to an embodiment of the disclosure. In the embodiment, the user unit does not need to send a request message as indicated in the arrow sign M320 of FIG. 3A. Instead, with the assistance of map data, the user unit calculates the duration of the user unit staying within the service coverage according to the geographical information such as the GPS coordinates and local speed limit, and then determines the information of the switch ratio, such as the extended access parameter (ExtendedAccess) or other values according to the duration. A number of examples of obtaining the information of the switch ratio with the assistance of map data are illustrated in Table 1. In Table 1, L (ms) denotes the latency requirement of an application of the service provider unit, and the information that can be provided according to the map data includes such as a speed limit P (km/h) and a transmission distance D (km), wherein the map data is provided by a navigation system or downloaded from an external source or is owned by the user unit. The formula for switch ratio is as follows:

the required time for traveling through the transmission coverage T=(D/P)*36001000 (ms);

the required number of control channel access (CCH access) C=T/(L/2);

the required number of service channel access (SCH access) S=T/50−C;

the extended access parameter (ExtendedAccess)=[S/C]/2.

TABLE 1

| | Latency Requirements of Application L (ms) | | | | | |
|---|---|---|---|---|---|---|
| | 1500 | 1250 | 1000 | 750 | 500 | 250 |
| Speed Limit P (km/h) | 40 | 50 | 60 | 70 | 80 | P ≧ 90 |
| Distance D (km) | 1 | 1 | 1 | 1 | 1 | 1 |
| T | 90000 | 72000 | 60000 | 51428 | 45000 | 36000 |
| C | 120 | 115 | 120 | 137 | 180 | 288 |
| S | 1680 | 1325 | 1080 | 891 | 720 | 432 |
| Extended Access Parameter | 7 | 6 | 4 | 3 | 2 | 1 |

As illustrated in Table 1, the extended access parameter ranges between 1 to 7, corresponding to different latency L (ms), such as ranging between 250 ms to 1500 ms, required by the application, wherein when the extended access parameter is equal to 1, 2, 3, the numbers of obtained service intervals are respectively equal to 3, 5, 7, and the switch ratios are respectively equal to 3:1, 5:1, 7:1, and other scenarios can be obtained in the same way. If the service provider unit and the user unit both use the above formula, then the service provider unit and the user unit can both achieve the channel access mode using the same switch ratio. In an example, if the user does not receive an end-of-service message, then the method proceeds to step S270, whether the user is outside the service coverage can be determined according to the calculation of the GPS coordinates, and the mode is switched to the original alternating access mode (i.e., the switch ratio is 1:1).

Regardless of the manners of implementations of step S250, as indicated in step S260, the user unit can record the coordinate information of the service provider unit of the service or update the service information accordingly. Step S260 can be performed after step S240 at other suitable time, and the step order is not limited to that exemplified in FIG. 2.

Moreover, the above formula of switch ratio can also be used in the service provider unit 100 of the first embodiment of FIG. 1. The service provider unit 100 can adjust the switch ratio between the control channel and the service channel according to the required frequencies for various applications at which the WSA message (or message) are to be sent, that is, according to the latency requirements of various on-board applications. The service provider unit 100 includes a processing module, a memory unit and a wireless communication module for providing the function of a roadside unit compliant with IEEE 1609 protocol.

Figure 4:
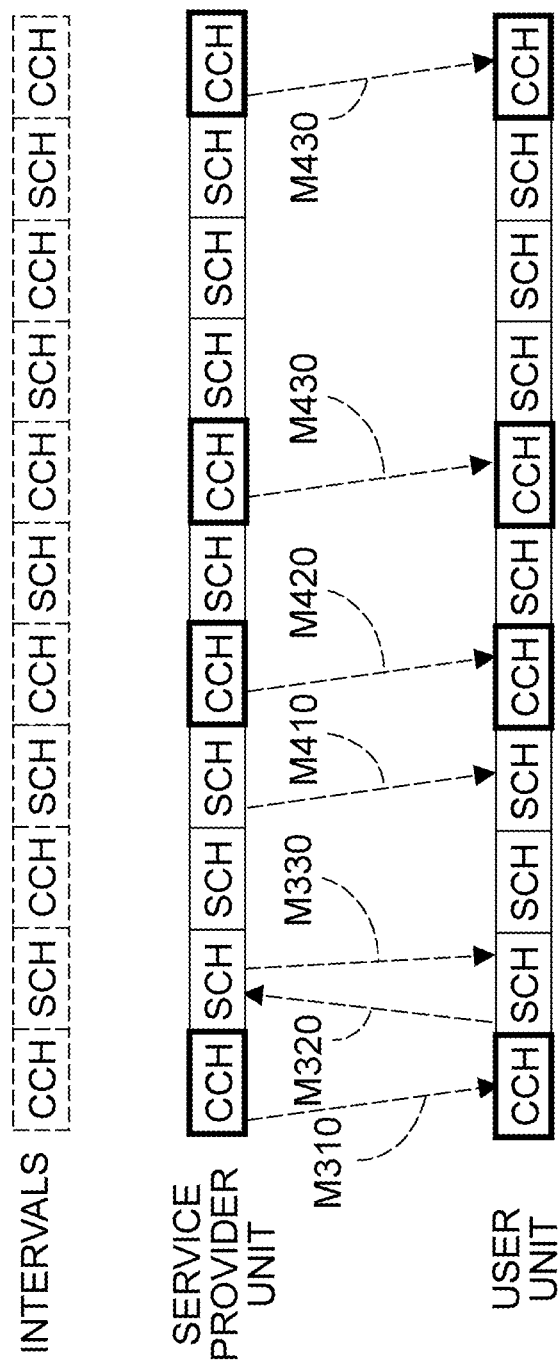
FIG. 4 shows a timing diagram for illustrating that an emergency message is transmitted to the user unit in a service interval according to an embodiment of the disclosure.

FIG. 4 shows a timing diagram of the channel via which an emergency message is transmitted to the user unit at a service interval according to an embodiment of the disclosure. When the service provider unit has emergency information to inform a nearby apparatus, an emergency message is sent to the user unit only at a service interval as indicated in the arrow sign M410 of FIG. 4, or as indicated in the arrow sign M420, the value of the "channel access" field of the WSA message is dynamically adjusted as 1 at a control interval to send an emergency switching message, and the mode is switched back to the alternating access mode and an emergency message is broadcasted at the next control interval. When the user unit of the service receives the emergency switching message and determines the "channel access" field of the emergency switching message, then the current service is limited to providing the access of service at the service interval, and the current mode is switched to an alternating switching mode, and is not switched to the original extended access mode until the WSA message whose "channel access" field equals 0 as indicated in the arrow sign M430 is received.

Figure 5:
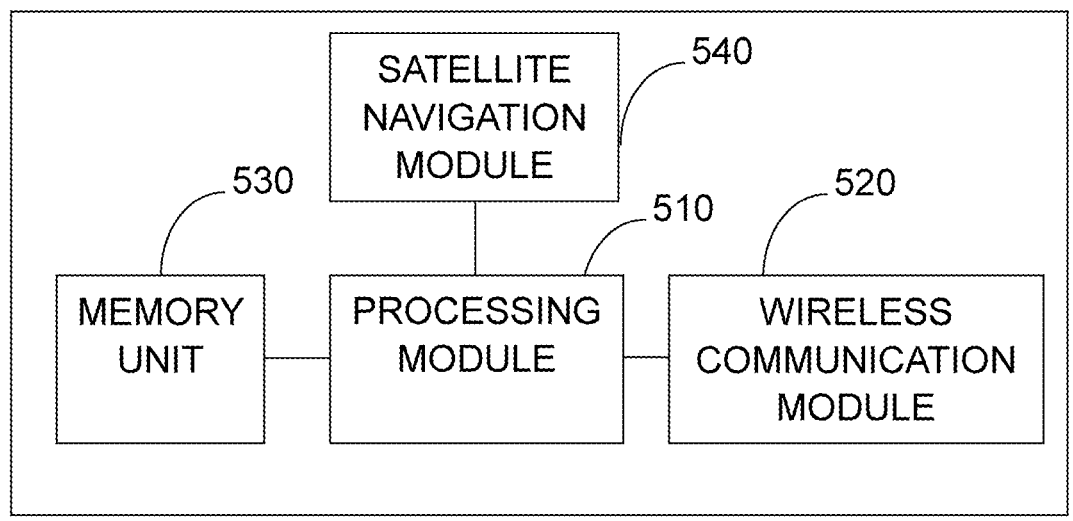
FIG. 5 shows a block diagram of a system for switching service channels in a vehicular environment according to an embodiment of the disclosure.

FIG. 5 shows a block diagram of a system for switching service channels in a vehicular environment according to an embodiment of the disclosure. For example, the user unit can be realized by an electronic device in the embodiment, wherein the electronic device can be adapted to different architectures, and is not limited to the diagram illustrated in FIG. 5. As illustrated in FIG. 5, the electronic device 500 includes a processing module 510, a wireless communication module 520, and a memory unit 530. The electronic device 500 can be used for implementing various practical examples of the method for switching service channels in a vehicular environment of FIG. 2. The wireless communication module 520 is a wireless communication module compliant with a multi-channel switching wireless network environment such as IEEE 1609 protocol for communicating with a service provider unit to receive a WSA message or send a message or a request. The processing module 510, e.g., a micro-processor, a micro-controller, or a dedicated chip, can be used for implementing the steps of FIG. 2. For example, when the processing module 510 performs step S220, the processing module 510 reads local service information from the memory unit 530 and searches whether information of the switch ratio is stored in the service information of the service provider unit. If so, as indicated in step S240, the processing module 510 controls the wireless communication module 520 to switch the channel according to the information of the switch ratio. The processing module 510 also performs step S250 to obtain information of the switch ratio.

In addition, the electronic device 500 further includes a satellite navigation module 540, which is a satellite navigation module compliant with GPS or other protocol for determining information of the switch ratio with geographical information of location information according to the embodiment of FIG. 3B or performing other requests, for example, determining whether the user unit is already outside the service coverage.

Moreover, the sequence of performing step S250 is not limited to the illustration in FIG. 2. In other embodiments, the performing sequence of step S250 can be modified. For example, after it is determined in step S210 that other channel access mode is used, the information of the switch ratio is obtained by way of searching the service provider unit (as illustrated in FIG. 3A) or performing calculation based on the map data (as illustrated in FIG. 3B and Table 1). Therefore, the method for switching service channels for vehicular communication of the disclosure is not limited to the illustration in FIG. 2.

In the above embodiment, when the "channel access" field equals 0, this implies that the service provider unit is operated at an access mode of an extended service channel. However, the way of indicating that the service provider unit 100 is operated at the access mode (such as step S210) of an extended service channel and the way of providing the information of the switch ratio is not limited to the way and sequence illustrated in FIG. 2. In other embodiments, the information of the switch ratio can be defined in the "channel access" field with a value other than 0 and 1, or in other fields of the WSA message that can be used as an extension field or an optional field, so as to inform the user unit.

Furthermore, the disclosure further discloses a computer or computing device readable medium on which a programming code or one or multiple programming modules are disposed. The programming code executes various embodiments for implementing the above method for switching service channels in a vehicular environment. The readable information storage medium of the embodiments is such as but not limited to optical information storage medium, magnetic information storage medium or memory such as a memory card, firmware, ROM, RAM or a built-in memory of programmable microcontroller. In addition, the above method can be implemented by a driver or a program library which provides an application programming interface.

In the above embodiments, IEEE 1906 protocol is used as an exemplification. However, the implementation of the disclosure can be extended to on-board communication systems under other multi-channel switching wireless communication environment. Any other embodiments can be regarded as embodiments of the disclosure if the switch ratio between the control channel and the service channel is adjusted according to the needs of the application and is obtained by way of searching or computation by the user unit.

A method and a system for providing service channels in a vehicular environment, a method and a system for switching service channels, and a computer readable medium of the application are provided in above embodiments of the disclosure. In some embodiments, the service provider adjusts the switch ratio between the control channel and the service channel according to characteristics of the service. In some embodiments, when the service user enters the service coverage, the service and the current access mode of the service provider can be dynamically obtained by way of query or computation based on the assistance of map data. Thus, the channel utilization rate can be effectively increased for the service provider and the service user via the use of the switch ratio capable of extending the time of the service channel.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for switching service channels in a vehicular environment for performing communications between a user unit and a service provider unit according to a switch ratio between a service channel and a control channel in a multi-channel switching wireless communication environment, the method comprising:
   in response to a message indicating that the service provider unit uses an access mode of an extended service channel, searching whether the information of the switch ratio is stored in service information of the user unit according to geographical information of the service provider unit;
   setting the user unit to enter the access mode of the extended service channel if the information of the switch ratio is stored in the service information of the user unit in the searching step;
   sending a request message by the user unit to request the service provider unit to provide the information of the switch ratio if the service information of the user unit does not include the information of the switch ratio in the searching step;
   in response to a message indicating the information of the switch ratio, setting the user unit to enter the access mode of the extended service channel to extend service channel access; and
   recording the information of the switch ratio and the geographical information of the service provider unit in the service information of the user unit.

2. The method for switching service channels in a vehicular environment according to claim 1, further comprising:
   determining the information of the switch ratio in the user unit according to a latency requirement of an application and map data if the service information of the user unit does not include the information of the switch ratio in the searching step; and
   setting the user unit to enter the access mode of the extended service channel according to the determined information of the switch ratio to extend service channel access.

3. The method for switching service channels in a vehicular environment according to claim 2, further comprising:
   recording the information of the switch ratio and the geographical information of the service provider unit in the service information of the user unit.

4. The method for switching service channels in a vehicular environment according to claim 2, wherein in the step of determining the information of the switch ratio, the information of the switch ratio is obtained according to a latency of the application, a speed limit, and a transmission distance, and the information comprising the speed limit and the transmission distance is obtained according to the map data.

5. The method for switching service channels in a vehicular environment according to claim 1, wherein the service provider unit sends an emergency switching message to the user unit at a control interval and broadcasts an emergency message at the next control interval, the access mode of the user unit is switched to an alternating access mode in response to the emergency switching message, and a corresponding switch ratio of the alternating access mode equals 1.

6. The method for switching service channels in a vehicular environment according to claim 1, further comprising:
   setting the access mode to an alternating access mode if the user unit determines that a location of the user unit exceeds a service coverage of the service provider unit.

7. The method for switching service channels in a vehicular environment according to claim 1, further comprising:
   setting the user unit to enter the alternating access mode in response to a message indicating that the service provider unit uses an alternating access mode, wherein a corresponding switch ratio of the alternating access mode equals 1.

8. The method for switching service channels in a vehicular environment according to claim 1, wherein the information of the switch ratio comprises a numeric value indicating the switch ratio between the control channel and the service channel.

9. The method for switching service channels in a vehicular environment according to claim 1, wherein a message indicating that the service provider unit uses the access mode of the extended service channel is a service advertisement message, and a channel access field of the service advertisement message comprises a numeric value indicating the access mode of the extended service channel.

10. A computer readable medium comprising instructions for executing the method for switching service channels in a vehicular environment according to claim 1.

11. A communication system using a vehicular communication service, the system comprising:
   a wireless communication module for communicating with a service provider unit according to a switch ratio between the service channel and the control channel;
   a memory unit; and
   a processing module, according to geographical information of the service provider unit, searching whether the information of the switch ratio is stored in the memory unit in response to a message indicating that the service provider unit uses an access mode of an extended service channel;

wherein the processing module sets the user unit to enter the access mode of the extended service channel according to the information of the switch ratio obtained from the memory unit, wherein if the processing module cannot obtain the information of the switch ratio from the memory unit, the processing module sends a request message to request the service provider unit to provide the information of the switch ratio;

the processing module sets the user unit to enter the access mode of the extended service channel to extend service channel access in response to a message indicating the information of the switch ratio; and the processing module further records the information of the switch ratio and the geographical information of the service provider unit in the memory unit.

12. The communication system according to claim 11, further comprising a satellite navigation module, wherein if the processing module cannot obtain the information of the switch ratio from the memory unit, the processing module determines the information of the switch ratio according to a latency requirement of an application and map data and sets the user unit to enter the access mode of the extended service channel to extend service channel access, and the map data is provided via the satellite navigation module.

13. The communication system according to claim 12, wherein the processing module further records the information of the switch ratio and the geographical information of the service provider unit in the memory unit.

14. The communication system according to claim 12, wherein the processing module obtains the information of the switch ratio according to a latency of the application, a speed limit and a transmission distance, and the processing module obtains the information comprising the speed limit and the transmission distance according to the map data.

15. The communication system according to claim 11, wherein the information of the switch ratio comprises an extended access parameter.

16. The communication system according to claim 11, wherein a message indicating that the service provider unit uses an access mode of an extended service channel is a service advertisement message, and a channel access field of the service advertisement comprises a numeric value indicating the access mode of the extended service channel.

17. A method for providing service channels in a vehicular environment, the method comprising:

adjusting a switch ratio between a control channel and a service channel in a service provider unit and sending a broadcast message indicating a channel access mode used by the service provider unit; and in response to the broadcast message indicating that the service provider unit uses an access mode of an extended service channel:

in a user unit, obtaining information of a switch ratio between the service channel and the control channel according to geographical information of the service provider unit; and setting the user unit to enter the access mode of the extended service channel, wherein the step of obtaining information of the switch ratio comprises:

sending a request message to request the service provider unit to provide the information of the switch ratio; and receiving a message indicating the information of the switch ratio to obtain the information of the switch ratio.

18. The method for providing service channels in a vehicular environment according to claim 17, wherein the service provider unit adjusts the switch ratio between the service channel and the control channel according to a latency requirement of an application.

19. The method for providing service channels in a vehicular environment according to claim 17, wherein the step of obtaining information of the switch ratio comprises:

searching the service information of the user unit to obtain the information corresponding to the switch ratio.

20. The method for providing service channels in a vehicular environment according to claim 17, wherein the step of obtaining information of the switch ratio comprises:

determining the information of the switch ratio according to a latency requirement of an application and map data.

21. A system for providing service channels in a vehicular environment, comprising:

a service provider unit for providing communication service, wherein the service provider unit adjusts a switch ratio between a control channel and a service channel and sends a broadcast message indicating a channel access mode used by the service provider unit; and a user unit, in response to the broadcast message indicating that the service provider unit uses an access mode of an extended service channel, the user unit obtaining the information of a switch ratio between the service channel and the control channel according to geographical information of the service provider unit, and setting the user unit to enter the access mode of the extended service channel, wherein the user unit obtains information from the switch ratio by sending a request message to request the service provider unit to provide the information of the switch ratio; and receiving a message indicating the information of the switch ratio to obtain the information of the switch ratio.

22. The system for providing service channels in a vehicular environment according to claim 21, wherein the service provider unit adjusts the switch ratio between the service channel and the control channel according to a latency requirement of an application.

23. The system for providing service channels in a vehicular environment according to claim 21, wherein the service provider unit is a communication apparatus with a single antenna.

* * * * *